Oct. 16, 1962 W. J. SCHMIDT ETAL 3,058,223
PULSE ACTUATED MEASURING APPARATUS
Filed Feb. 2, 1960 4 Sheets-Sheet 1

Oct. 16, 1962 W. J. SCHMIDT ETAL 3,058,223
PULSE ACTUATED MEASURING APPARATUS
Filed Feb. 2, 1960 4 Sheets-Sheet 3

FIG. 3B

FIG. 3C 3,058,223
PULSE ACTUATED MEASURING APPARATUS
Warren J. Schmidt, Upper Montclair, and Seymour Salowe, East Orange, N.J., assignors to Westinghouse Electric Corporation, East Pittsburgh, Pa., a corporation of Pennsylvania
Filed Feb. 2, 1960, Ser. No. 6,268
19 Claims. (Cl. 33—129)

This invention relates generally to measuring apparatus and more particularly to such a mechanism for measuring the footage of paper which is transferred from a working or machine roll to a shipping roll.

In the manufacture of paper, the paper from the paper machine is normally rolled into a very large roll which may be as wide as twenty feet, ten or fifteen feet in diameter, and contains a great quantity of paper. Such bulk rolls are bulky, very heavy, and are normally of a quantity not desired by the customer.

It is, therefore, necessary to reroll the paper into shipping rolls of a width and length which will fit the customer's requirements which in the art is called winding. In prior art operations, the amount of paper on a shipping roll has been generally figured in pounds. In certain instances it is desirable to know the number of feet on the shipping roll with greater accuracy than may be obtained by a weight measurement.

It is a prime object of this invention to provide a new and improved mechanism for measuring the footage of paper transferred from the working roll to the shipping roll.

A further object of this invention is to provide in such a mechanism means for detecting an interruption in the flow of paper from the working roll to the shipping roll in a manner such that even if the moving apparatus continues to move, the footage counting will be interrupted thereby preventing a false count of the footage of paper on the shipping roll.

Another object of this invention is to provide such a mechanism in which the actual number of feet of paper which has been transferred from the working roll to the shipping roll may be ascertained at any time.

Another object of this invention is to provide in such a mechanism means for making a printed record of the footage of the paper in a shipping roll.

Another object of this invention is to provide such a mechanism which is purely electrical.

Another object is to provide a measuring mechanism which has no physical contact with the material being measured.

Another object of this invention is to provide a new and economical apparatus of the character described.

Other objects of this invention will be apparent from the specification, the appended claims and the drawings, in which drawings:

FIG. 3 comprising FIGS. 3A, 3B and 3C schematically illustrate a circuit embodying the invention.

Figure 1:
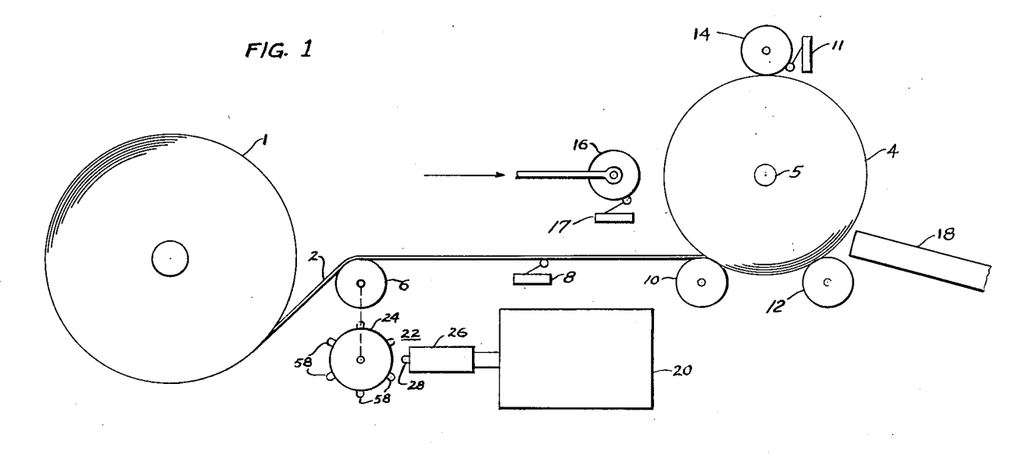
FIGURE 1 is a schematic view showing the invention as applied to paper transfer apparatus or winder.

Referring to the drawings by characters of reference and more particularly to FIG. 1, the numeral 1 indicates a working roll of paper 2 from which paper is transferred to a shipping roll 4. The paper 2 from the working roll 1 passes over an idler roll 6, over a "paper break" sensing switch 8, and around a core piece or mandrel 5 of the shipping roll 4. The switch 8 may be a light actuated switch responsive to the passage of light when the paper breaks. The shipping roll 4 rides upon a pair of idler rolls 10 and 12 and is rotated by a rider roll 14 resting upon the shipping roll 4. The rider or drive roll 14 is rotated from a source of power through suitable mechanism (not shown). After a desired footage of paper has been wound upon the mandrel 5, suitable mechanism (not shown) cuts the paper and seals the roll 4 after which a pusher device 16 pushes the shipping roll 4 from the rolls 10 and 12 onto a suitable incline 18 for movement to a suitable location for storage or shipment.

The counting apparatus 20 is actuated by a reluctance pick-up unit 22 which comprises a toothed gear 24 rotatable with the idler roller 6 and a permanent magnet voltage generating unit 26 which supplies an alternating potential pulse to the counter 20 each time a tooth 58 passes by the feeler or pick-up pole piece 28. The drive mechanism between the roll 6 and gear 24 is preferably such that a tooth 58 passes the pole piece 28 for each foot of paper passed over the roll 6. The unit 26 may be of any usual type available on the market, of the permanent magnet type or otherwise, so long as it generates a voltage pulse each time a tooth passes its feeler 28.

Figure 2:
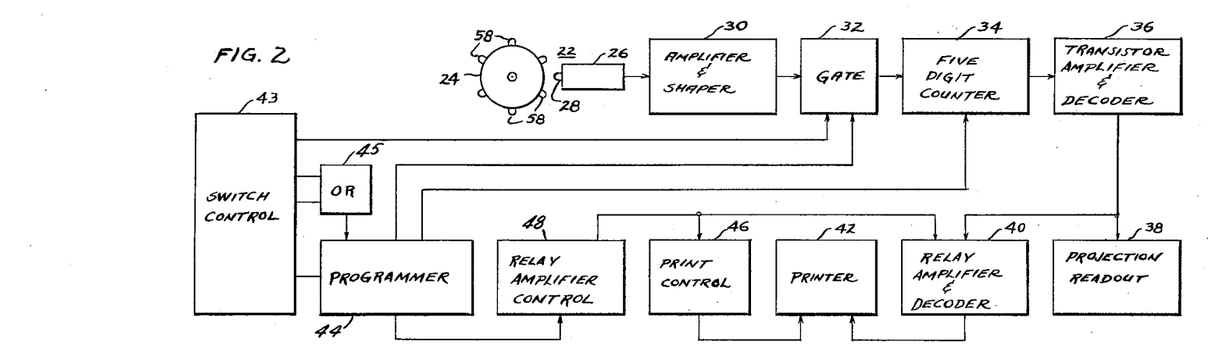
FIG. 2 is a block diagram illustrating the invention.

Referring to FIG. 2, the apparatus 20 comprises an amplifier and pulse shaper network 30 which feeds pulses through a gate 32 to a five digit counter 34. The output of the counter 34 is fed into a transistor amplifier and decoder network 36. Signals therefrom are supplied into a projection readout device 38 and into a relay amplifier and decoder network 40 for subsequent actuation of a printer mechanism 42 under control of a print control 46 and relay amplifier control 48. The operations of the gate 32 and of certain of the other units is controlled by a programmer 44. Suitable actuating switches are diagrammatically represented by the switch control 43 and the OR network 45.

Only one digit counter 34, decoder 36 and read-out device 38 are shown and these will count up to ten digits and are responsive to units. Any number of additional counters identical to counter 34 may be arranged in series operation to provide for counting the tens, hundreds, etc. As will be apparent from the detailed circuits to be described below, an additional amplifier and read-out device will be needed for each additional counter.

The device or devices 38 will provide a continual visual indication of the paper footage transferred to the working roll. The relays in the relay amplifier and decoders, however, are not actuated until the completion of the shipping roll 4. This prevents excessive wear of the various relays and solenoids in the units 40, 42 and 46.

The programmer 44 conditions the apparatus to count the supplied pulses and at the end of a counting interval, under actuation by the pusher device switch 17, to cause the apparatus to print out on a suitable tape the footage of the finished roll. The rider roll switch 11 resets the programmer 44 for a subsequent operation. A manual resetting switch 120 is provided for use when desired. As will be shown below the manual switch not only conditions the apparatus for counting but also resets the counter 34 which resets the units actuated thereby.

The amplifier and pulse shaper network 30 amplifies and shapes the pulses generated by the change in reluctance of the pick up unit 22 into pulses of a characteristic which will positively actuate the counter 34. Since the speed at which the paper is rolled onto the shipping roll 4 may vary from downwardly of 75 feet per minute to upwardly of 10,000 feet per minute, the magnitude of and shape of the output pulses of the pick up unit 22 will vary widely. The network 30 as will be explained below will transform this variable amplitude variable length pulse and shape it into a constant amplitude constant length pulse.

Figure 3A:
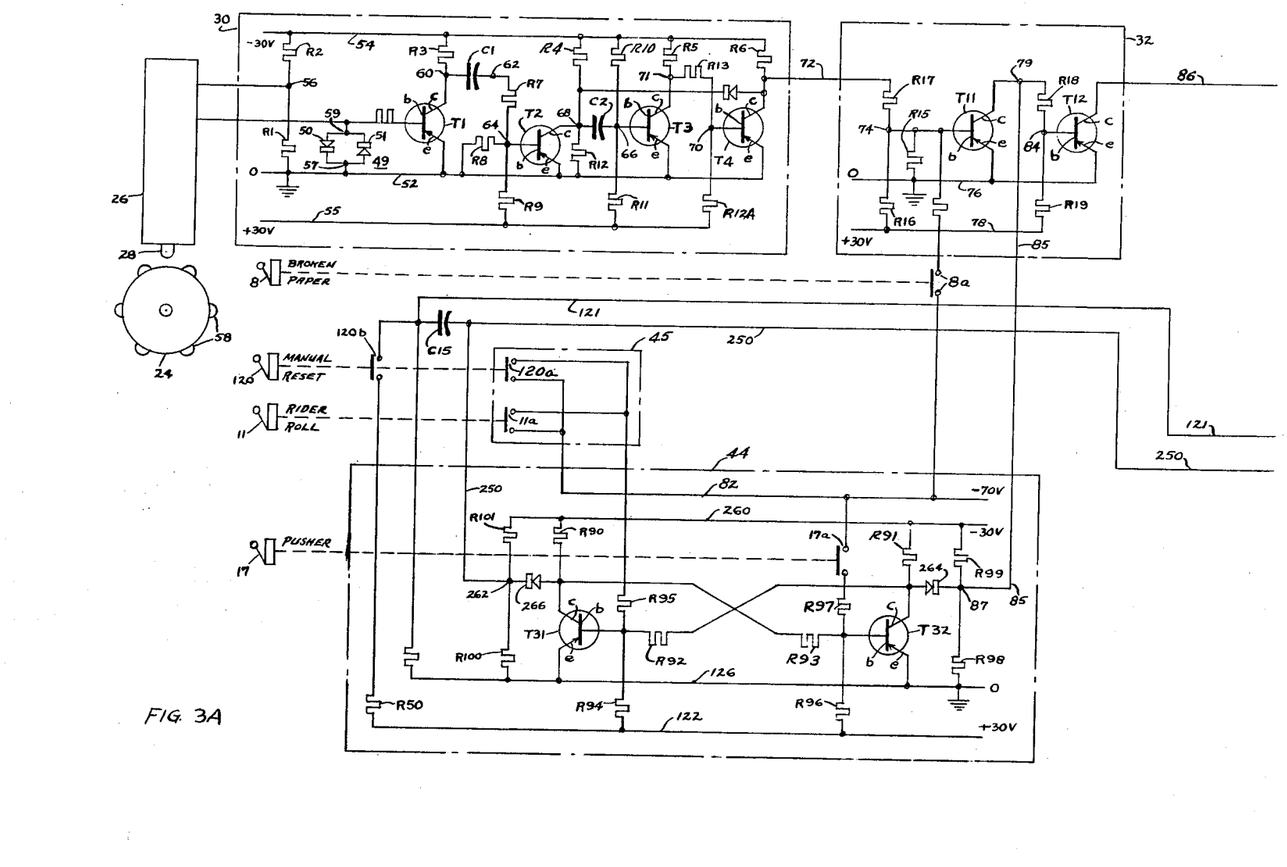

In order to insure against excessive voltages appearing between the base *b* and emitter *e* of the transistor T1, the output of the generating unit 26 is delivered across a network 49 comprising a pair of anti-parallel arranged rectifiers 50 and 51 connected in series with a suitable resistor R1. The resistor R1 comprises a part of a voltage dividing network consisting of a pair of resistors R1 and R2 series connected between a pair of potential supplying busses 52 and 54 and having a common point 56 intermediate the resistors R1 and R2. The relative magnitudes of the resistors R1 and R2 may have a ratio approximating one to two hundred but the ratio is not critical as long as the value of R1 is a minor fraction of the value of R2.

One terminal 57 of the network 49 is connected to the emitter *e* of the transistor T1. The other terminal 59 of this network 49 is connected to the base *b* of the transistor T1 through a current limiting resistor. With this arrangement the forward voltage drop of the rectifiers limits the magnitude of the control voltage which may be applied to the transistor T1 by the generating unit 26 and renders the potential applied to transistor T1 substantially independent of the paper speed.

In the absence of a tooth 58 passing the feeler 28 no potential is developed in the unit 26 and the potential of the base *b* of transistor T1 is substantially that of the emitter *e* thereof and transistor T1 is for control purposes nonconductive.

The network 30 additionally comprises transistors T2, T3, and T4. The values or transistors T1, T2, T3, and T4 have their emitters *e* all connected to the ground potential bus 52 and their collectors *c* individually connected to the −30 volt bus 54 through resistors R3, R4, R5, and R6. A coupling capacitor C1 couples the transistors T1 and T2. One terminal 60 of the coupling capacitor C1 is normally maintained at substantially the potential of bus 54 due to the normally blocked condition of transistor T1. The other terminal 62 of this capacitor C1 is connected through a current limiting resistor R7 to the base *b* of transistor T2. The base *b* of this transistor T2 is also connected to the common point 64 of a pair of voltage dividing resistors R8 and R9 connected between the ground bus 52 and a bus 55 maintained at substantially 30 volts above ground. Under standby conditions the capacitor C1 assumes a change with its terminal 62 being positive with respect to its terminal 60.

When a tooth 58 passes the feeler 28, the unit 26 develops an A.-C. pulse across the network 49. During one half cycle this pulse merely passes current through the rectifier 50 tending to maintain the base *b* at an elevated potential with respect to the emitter *e* and the transistor T1 remains nonconducting. During the other half cycle current flows through the rectifier 51 and the parallelly connected emitter-base circuit of the transistor T1 causing the transistor to conduct.

The point 64 in the absence of a charging current flow to or from the capacitor C1 will be positive with respect to bus 52 and the transistor T2 will normally be held nonconducting. Upon conduction of the transistor T1, the potential of terminal 60 is raised from its normal below ground potential to substantially ground potential. The other terminal 62 is thereby transiently raised to a potential above ground and the transistor T2 remains blocked. The time constant of the discharge circuit of the capacitor C1 which extends through the resistors R7 and R8 and transistor T1 is low and the capacitor C1 rapidly discharges so that when the transistor T1 reblocks the transistor T2 conducts. The length of the conductive period of transistor T2 will be fairly constant and more or less independent of the conductive time of the transistor T1.

The base *b* of transistor T3 is connected to a common point 66 of the resistors R10 and R11 connected in series between the busses 54 and 55. The relative values of these resistors are so chosen that the point 66 is normally maintained at a potential below that of the bus 52 so that emitter to base current will flow in the transistor T3 and T3 will conduct emitter to collector. It is rendered non-conducting each time transistor T2 conducts by means the coupling capacitor C2 which is connected between point 66 and a terminal 68 which is common to resistor R4 and the collector *c* of the transistor T2. A resistor R12, connected between the emitter *e* and the collector *c* of the transistor T2 limits the minimum potential of the terminal 68 during non-conducting periods of the transistor T2.

Conduction of transistor T2 raises the potential of the terminal 68 and, since the charge on the capacitor C2 cannot instantaneously change, the potential of the base *b* of the transistor T3 will be raised to render the transistor T3 non-conducting for a time period determined by time constant of the capacitor C2 and its discharge circuit and independent of the conducting period of transistor T1.

The base *b* of the transistor T4 is connected to a common point or terminal 70 of a pair of series connected resistors R12A and R13. The free end of resistor R12A is connected to the bus 55 and the free end of resistor R13 is connected to terminal 71 which is common to the collector *c* of the transistor T3 and the resistor R5. Transistor T3 is normally conducting and the potential of terminal 71 will normally not be substantially different than that of the bus 52. It will be apparent that under these conditions the base *b* of transistor T4 is elevated above ground and no turn on current will flow in transistor T4. The values of the resistors R12A and R13 are so chosen, however, that when the transistor T3 blocks and the potential of the terminal 71 is held substantially below that of the bus 52, the potential of the point 70 and base *b* of transistor T4 will be reduced sufficiently to cause turn on current to flow and the transistor T4 to conduct. Conduction of transistor T4 raises the potential of the output conductor 72 of the network 30 to supply an energizing pulse to the counter 34 of predetermined constant length, providing the gate 32 is open.

The gate 32 comprises a pair of values or transistors T11 and T12. Each transistor has an emitter *e*, a base *b* and a collector *c*. The transistor T11 is normally conducting but may be rendered non-conductive by a pulse on conductor 72 unless per chance this pulse is overridden by a superior current through the broken paper sensitive switch 8. The transistor T12 is normally non-conducting but may be made conducting by the blocking of transistor T11 providing no overriding positive signal is applied thereto from the programmer 44. Conduction of transistor T12 raises the potential of conductor 86 to energize the counter 34.

Specifically, the emitter *e* of the transistor T11 is connected to a ground potential conductor or bus 76. Its base *b* is connected to the conductor 72 through a resistor R17 and is connected to a common point 74 between a pair of series connected resistors R15 and R16 connected between the ground potential bus 76 and a bus 78 held at 30 volts positive with respect to ground. The collector *c* of transistor T11 is connected to terminal 79 which in turn is connected through a pair of series connected resistors R18 and R19 to the bus 78. The values of the resistors R15, R16 and R17 are so chosen that when the transistor T4 is not conducting the potential of point 74 is below that of the bus 76 and the transistor T11 conducts. When however, the transistor T4 conducts and the potential of the conductor 72 rises, the potential of the point 74 rises and renders the transistor T11 non-conducting. The base *b* of the transistor T11 is selectably connected through the switch 8 to a bus 82 which is maintained 70 volts negative with respect to bus 76. When switch 8 is closed, transistor T11 will remain conducting irrespective of the potential of conductor 72 and no pulses are transmittable through the gate from the shaper 30 to the counter 34.

The base *b* of transistor T12 is connected to a common point or terminal 84 between the resistors R18 and R19. The emitter *e* of this transistor T12 is connected to the ground bus 76 and the collector *c* thereof is connected by a conductor 86 to the counter 34. The transistor T11, is normally conductive, the potential of terminal 79 will be substantially at the potential of bus 76 and the potential of the terminal 84 will be above that of the bus 76 whereby transistor T12 is being held nonconductive. The terminal 79 is connected by means of a conductor 85 to a terminal 87 in the programmer 44. The potential of this terminal, as will be described below in connection with the programmer 44, may be maintained at ground potential to prevent the transistor T12 from being cycled by the transistor T11 for closing gate 32 or it may be reduced below ground potential to permit cycling of the conductive condition and opening of the gate 32.

The counter 34 comprises a plurality of values or transistors T41, T42, T43, T44, T45, T46 and T47 connected together to conduct in certain patterns to respond to any of ten digits. The transistors T41 and T42 are connected together to provide a bistable multivibrator network 88. The transistors T43—T47 are connected together in a ring of five. Four of the transistors normally conduct with one normally blocked. Each time the transistor T12 conducts, the multivibrator network 88 reverses the conductive condition of the transistors T41 and T42. Each time the transistor T42 conducts, the blocked one of the transistors T43—T47 becomes conductive and the next succeeding transistor becomes nonconducting. Since the transistors T43—T47 are in effect ring connected, transistor T43 is the next succeeding transistor to transistor T47. It will be appreciated that ten pulses are required for a complete sequence and counter 34 will indicate only the unit number.

In order to count the number of sequences of the unit counter, additional counters like 34 may be serially connected with each other and with counter 34 for counting tens, hundreds, thousands, etc. Each succeeding counter may be driven by a pulse derived from the reconduction of the transistor of the preceding counter corresponding to transistor T47 of counter 34. The pulse for the tens counter would be derived from the terminal 90 of the counter 34 and applied to the bistable multivibrator network thereof in the same manner that conductor 86 applies pulses to the network 88 of the counter 34.

Specifically the counter 34 includes a ground potential bus 92, a bus 94 held at minus 30 volts and a bus 96 held at plus 30 volts with respect to ground potential bus 92. The emitters e of each of the transistors T41—T47 are connected to the bus 92. The collectors c of each of these transistors are connected through individual resistors R21—R27 to the negative bus 94. The bases b of each of these transistors are connected through individual resistors R31—R37 to the positive bus 96.

The base b of transistor T41 is additionally connected through a resistor R31a to the collector c of the transistor T42. The base b of transistor T42 is likewise additionally connected through a resistor R32a to the collector c of the transistor T41. The bases b of each of these transistors are also individually connected through a series connected capacitor and rectifier C4—98 and C5—100 to the conductor 86 which supplies the control pulses from the gate 32. First and second pairs of series connected resistors R38—R39 and R40—R41 are connected between the busses 92 and 94 and each is provided with a common point or terminal (104—106) intermediate the resistors. A terminal 107 is located intermediate the collector c of transistor T41 and resistor R21 and a terminal 109 is correspondingly located intermediate the collector c of transistor T42 and resistor R22. Rectifiers 108 and 110 are respectively connected between the terminals 107—104 and 109—106. The points 104 and 106 are also individually connected by conductors 112 and 114 to points 116 and 118, which are the common points between the capacitor C4 and rectifier 98 and between the capacitor C5 and rectifier 100 respectively.

When the counter 34 is in a condition to start a counting operation, the transistor T42 is conducting and the transistor T41 is nonconducting. This relationship is assured by closure of the manual reset switch 120 which upon closure connects the base b of the transistor T41 via conductor 121 and resistor R50 to a positive potential supply which, as shown, is the bus 122 of the programmer 44. A rectifier 124, provided in this circuit prevents any current flow from the network 88 to the conductor 121.

With transistor T41 nonconducting, the collector c thereof is at substantially the potential of the negative bus 94. The resistors R32 and R32a form a voltage divider and their values, which may be a 9 to 1 ratio, are so chosen that, with transistor T41 nonconducting, the potential of base b of transistor T42 is slightly below ground potential and conduction of transistor T42 is assured. Likewise the resistors R31 and R31a are of substantially the same value as are resistors R32 and R32a and form a voltage divider. Due, however, to the conductive condition of transistor T42, its collector c is substantially at ground potential and the base b of transistor T41 is slightly above ground potential and conduction of transistor T41 is assured. The network 88 is therefore in a stable condition and will remain that way until upset by a pulse on the conductor 86.

A potential pulse on the conductor 86 acts through the capacitors to flip the multivibrator 88. With transistor T41 conducting as above set forth, capacitor C5 will remain in a substantially uncharged state; one terminal thereof being connected to base b of transistor T42 which is only slightly below ground potential and the other terminal thereof being connected through conductor 112 to terminal 104 which is held at substantially ground potential by the conducting transistor T41 and rectifier 108. Capacitor C4 on the other hand, will be charged to a substantial portion of the voltage appearing between the busses 92 and 94. One terminal of C4 is connected to base b of transistor T41 which is substantially at ground potential and the other terminal thereof is connected through conductor 114 to point 106 which is at a potential substantially below ground.

When the potential of the conductor 86 is raised to ground potential due to conduction of the transistor T12 of the gate 32, it brings with it the terminal 118. This transiently raises the potential of both sides of the capacitor C4 to terminate base current flow in and collector current through transistor T41 ceases. When transistor T41 stops conducting, the potential of the terminal 107 decreases lowering the potential of the adjacent end of the divider network R32—32a thereby reducing the potential of the base b of the transistor T41. When this occurs, emitter to base current flows and transistor T42 commences to conduct emitter to collector. The conduction of T42 raises the potential of its collector c to further raise the potential of the base b of the transistor T41. The foregoing process of lowering the potential of base b of transistor T42 and raising the potential of base b of transistor T41 continues until T42 is fully conducting and T41 is fully blocked. The next subsequent pulse in the conductor 86 will reverse the conduction of the transistors T41 and T42 in substantially the manner described. Further pulses on conductor 86 will continue to trigger the bistake multivibrator as described.

The transistors T43—T47 are connected into a "ring-of-five" in which four thereof are always conducting. This is accomplished by connecting collectors c and bases thereof to buses 126—130. Specifically, the collectors c of these transistors are individually connected to respective ones of the buses and the bases b are individually connected through resistors to the four of the buses which are not connected to its collector c. For example, the base b of transistor T45 would be connected to buses 126, 127, 129 and 130. It would not be connected to the bus 128 which is connected to the collector c of transistor T45. In order to cause the blocked transistor to be sequenced about the ring, the base circuits of the transistors T43—T47 are additionally individually connected to a bus 140 through networks comprising a capacitor series connected with a rectifier (C6—134; C7—135; C8—136; C9—137; and C10—138). The common points of these networks are individually connected to the collector of the preceding said transistor through resistors R42—R46. Upon energization of the buses 92, 94 and 96 of the counter 34, one of the transistors T43—T47 will initially start conducting ahead of the others due to inherent slight differences therein and for purposes of explanation it will be assumed that transistor T44 was the first to initiate conduction. When this occurred the potential of bus 127 was raised to nearly ground potential and the base $b$ of each of the other transistors T43, T45, T46, and T47 were then connected through one of the base resistors to ground. Since in order to raise the base potential sufficiently to prevent conduction of the transistor the base $b$ thereof must be connected through four resistors, none of the four thereof is held blocked and another thereof will conduct which for example we shall call transistor T46. This causes the bases $b$ of transistors T43, T45, and T47 to be connected to ground through two resistors and the base $b$ of transistors T44 and T46 to be connected to ground through one resistor each. Still none of the "ring-of-five" transistors has its base $b$ at a blocking potential and still another transistor conducts which will be assumed to be transistor T43. Bases $b$ of transistors T45 and T47 are each connected to ground through three resistors and transistors T43, T44, and T46 are connected to ground through two resistors. Finally, one of the transistors T45 and T47 will conduct. Assuming it to be transistor T47, the base $b$ of transistor T45 will now be connected to ground through four resistors. Its base therefore will be above ground potential and transistor T45 will remain blocked. Each of the conducting transistors T43, T44, T46 and T47 will have their bases connected through three resistors. It should be understood that it is indeterminate which four of the five transistors T43—T47 will initially conduct and in which order.

The counter 34 is designed to have a zero reading when transistor T43 is the one of the "ring-of-five" transistors which is initially blocked. To insure this initial state a manually operable resetting circuit is provided by connecting the base $b$ of transistor T43 to the conductor 121 through rectifier 132 so that when the manual reset switch 120 is closed, the potential of the base $b$ of the transistor T43 is elevated above ground potential since this base $b$ is now connected to the positive potential source not only through resistor R33 but also through the resistor R50. This raises the potential of base $b$ of transistor T43 and terminates forward base current causing this transistor to cease conducting.

When transistor T43 blocks, the bus 126 is no longer connected to the ground potential bus 92 and the bases $b$ of transistors T44, T46, and T47 are now only connected to ground through two resistors each. This is without effect on their continued conductivity since they are already conducting. The disconnecting of bus 126 from ground does however reduce the number of ground connections to base $b$ of transistor T45 to three and transistor T45 commences to conduct thereby connecting bus 128 to ground. This results in increasing to three the ground connections to the bases $b$ of transistors T44, T46, and T47 and to four to the base $b$ of transistor T43 which will now remain non-conducting after the manually operable reset switch 120 is opened.

In order to operate the "ring-of-five transistors to cause the non-conducting one thereof to shift around the ring, the free capacitor terminals of each of the rectifier capacitor networks C6—134; C7—135; C8—136; C9—137; and C10—138 are connected to a bus 140 which connects with terminal 109 of the multivibrator network 88. This terminal during conduction of transistor T42 is held substantially at ground potential and during non-conduction of transistor T42 is substantially below ground potential. When in the course of events a pulse flips the multivibrator 88, as described above, to cause transistor T41 to conduct and T42 to block, the potential of bus 140 is lowered substantially below ground without effect on the transistors T43—T47 because of the rectifiers 134—138 which prevent the bases $b$ of transistors T43—T47 from following. The second pulse which is supplied to the multivibrator 88 will cause transistor T41 to block and transistor T42 to reconduct. Reconduction of T42 raises the potential of bus 140. During the blocked period of transistor T43 the capacitors C6, C8, C9, and C10 remained substantially uncharged since the bases $b$ of the transistors T43, T45, T46, and T47 were nearly at ground potential and the collectors $c$ of the transistors T47, T44, T45, and T46 were also substantially at ground potential. The capacitor C7, however, did receive a substantial charge since the base $b$ of transistor T44 is nearly at ground potential and the collector $c$ of the blocked transistor T43 is at a potential substantially below ground. Therefore, when the increase in potential of the bus 140 raises the potential of the adjacent terminal of the capacitor C7 from its low negative potential to substantially ground potential, the potential of the other terminal of capacitor C7 raises the potential of the base $b$ of transistor T44 causing it to block. Blocking of the transistor T44 results in the lowering of the potential of the bus 127 to remove one of the ground connections to the base $b$ of the transistor T43 which results in the transistor becoming conductive and the bus 126 being raised to ground potential. The base $b$ of the transistor T44 now has four ground connections and it remains blocked. Each time the transistor T42 becomes conducting the next of the transistors T45, T46, T47, T43, T44, etc. becomes blocked in that order and in endless fashion.

Figure 3B:
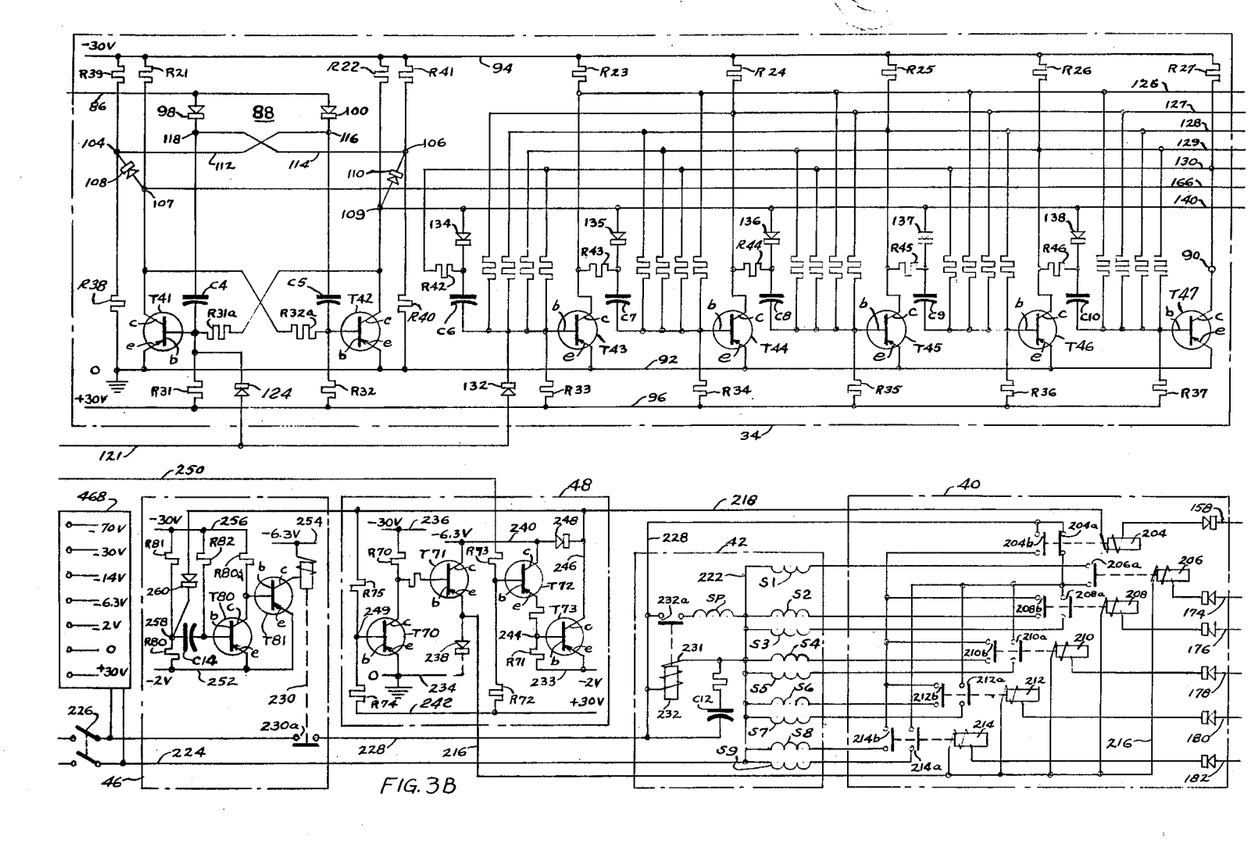

The buses 126—130 and 140 together with an additional bus 166 extends from the counter 34 to the transistor amplifier and decoder 36 which decodes the signals from the counter to energize the projection read-out device 38 whereby the units digit which represents the quantity of paper on this shipping roll 4 is visually indicated.

The decoder 36 includes a pair of inverse power amplifying networks 142 and 144. The networks include amplifying values or transistors T50 and T52 which are actuated in step with the multivibrator 88 and a pair of power values or transistors T51 and T53 which control the energization of a pair of buses 160 and 162. The transistor T51 conducts for odd digits to energize bus 160 and the transistor T53 conducts for even digits to energize bus 162. Five amplifying values or transistors T60, T62, T64, T66, and T68 are also provided. These are connected to conduct inversely with the transistors T43—T47 so that only one thereof is conducting at any given time. These transistors T60, T62, T64, T66, and T68 respectively control a plurality of power values or transistors T61, T63, T65, T67, and T69. One of these last named power transistors conducts for each of an odd and even digit and whether an even or odd digit signal results is determined by the networks 142 and 144. For example either digits 4 and 5 will occur when amplifying transistor T66 conducts. The even digit 4 occurs when the transistor T53 conducts and the odd digit 5 occurs when transistor T51 conducts.

The amplifying transistors T50 and T52 have their emitters connected to a zero potential or ground bus 150 and their emitters connected through voltage dropping resistors to the 30 volt negative bus 152. The collectors $c$ of the transistors T51 and T53 are connected to the bus 154 which is maintained at minus 6.3 volts. The emitters $e$ of these transistors T51 and T53 are connected by means of conductors 156 and 158 to buses 160 and 162 in the read-out device 38. The bases $b$ of the transistors T50 and T52 are connected through resistors R52 and R53 to a bus 164 which is maintained at plus 30 volts.

The base b of the transistor T52 is also connected through a resistor R55 to the bus 140 and the base b of the transistor T50 is connected through resistor R54 to a bus 166 which is connected to the terminal 107 of multivibrator 88. It will be recalled that during the even digits, the transistor T42 of the multivibrator 88 is conducting whereby the bus 140 thereof is maintained substantially at ground potential. This causes above ground potential to be applied to the base b of the transistor T52 and the same is prevented from conducting. Transistor T53 has its base connected through a current-limiting resistor to the collector c of the transistor T52. When transistor T52 is conducting base b of transistor T53 is substantially at ground potential and transistor T53 will be blocked since the potential of bus 154 is always below ground potential. When, however, transistor T52 is blocked as occurs when transistor T 42 conducts, the potential of the base b of transistor T53 is lowered enough to cause transistor T53 to conduct. Therefore, transistors T42 and T53 block and conduct concurrently. The transistor T51 has its base b connected through a current-limiting resistor to the collector c of the transistor T50 so that the transistors T41 and T51 conduct and block concurrently in the same manner described in connection with transistors T42 and T53.

The emitters e of the transistors T60, T62, T64, T66, and T68 are connected respectively through resistor network R60, R61, R62, R63, and R64 respectively to the ground potential bus 168. The collectors c of these same transistors are each connected directly to a bus 170 which is maintained at minus 14 volts. The bases b of these same transistors are respectively connected to the buses 126, 127, 128, 129 and 130. With this arrangement, the transistors T60, T62, T64, T66 and T68 conduct inversely with the transistors T43—T47 and one of the transistors T60, T62, T64, T66 and T68 will always conduct. The particular one which is conducting will be determined by the blocked one of the transistors T43—T47.

The power transistors T61, T63, T65, T67 and T69 have their emitters e connected to a power supplying bus 172 which is maintained at minus 2 volts. The collectors c of these same transistors are connected respectively to the buses 174, 176, 178, 180 and 182 which interconnect with lamps L0—L9 of the projection readout device 38. The bases b are connected respectively to the mid-taps 184, 186, 188, 190 and 192 of the resistor networks R60, R61, R62, R63 and R64 respectively. It will be appreciated that when the amplifying transistors T60, T62, T64, T66 and T68 are maintained blocked, the potential of the bases b of the associated power transistors T61, T63, T65, T67 and T69 will be substantially at ground potential while the respective emitters will be below ground potential and the power transistors will be in a blocked or non-conducting condition. When, however, the corresponding amplifier transistor conducts, it lowers the potential of the base b of the associated transistor to a potential which is substantially below that of the emitter thereof and the associated power transistor conducts to connect the output bus thereof to the power bus 172.

The read-out device 38 comprises a plurality of indicator lamps L0, L1, L2, L3, L4, L5, L6, L7, L8 and L9. One terminal of each of the even number read-out lamps is connected to the bus 162 while one terminal of the odd number read-out lamps is connected to the bus 160. The lamps L0—L1; L2—L3; L4—L5; L6—L7; and L8—L9 are connected respectively to the conductors 174, 176, 178, 180 and 182 respectively. Current is prevented from flowing from the lamps L0—L9 into the conductors 174, 176, 178, 180 and 182 and between the conductors 160, 162, by means of a plurality of rectifiers individually connected in series with each lamp L0—L9 and one of the conductors 174, 176, 178, 180 and 182 with which it is associated. One of the buses 160, 162 will always be connected to the minus 6.3 volt bus 154 and one of the conductors 174—182 will always be connected to the minus 2 volt potential bus 172. Therefore, one of the lamps L0—L9 will always be illuminated.

Figure 3C:
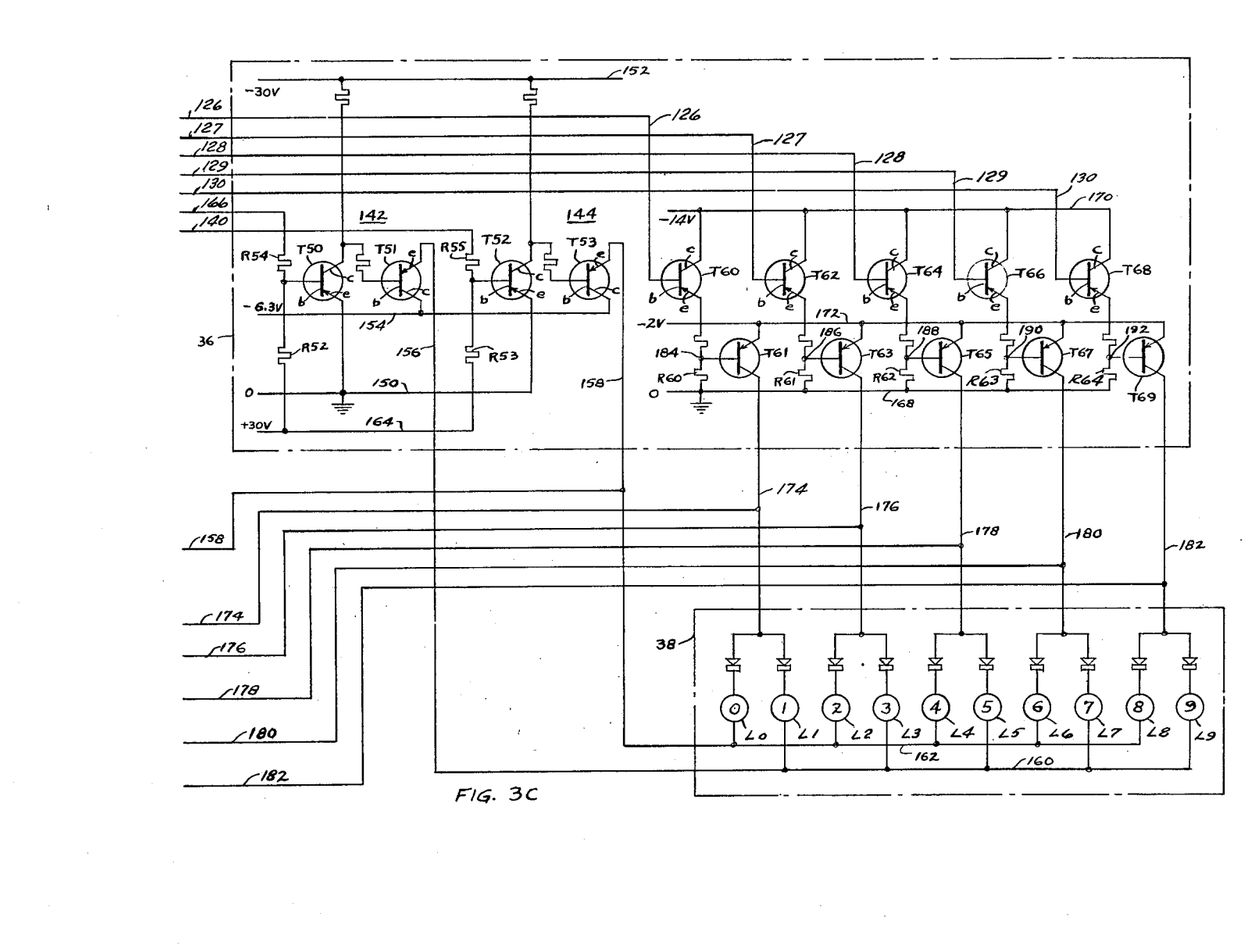

In order that a printed record may be made of the number of feet of paper on the machine roll 4, a relay amplifier and decoder 40, printer 42, print control 46 and relay amplifier control 48 are provided. The relay amplifier and decoder 40 comprises a plurality of relays 204, 206, 208, 210, 212, and 214. The relays 206, 208, 210, 212, and 214 each have one terminal of its energizing winding connected to a bus 216 which is connected to and from a bus 240 in the print control 46 which is continually maintained at a potential which is below ground. The other terminals of the windings of the relays 206, 208, 210, 212, and 214 are individually connected through rectifier to the buses 174, 176, 178, 180, and 182 respectively. It will be appreciated that while the buses 174—182 are selectively energized and deenergized during the counting operation, the relays 206—214 will remain deenergized except during the period in which the bus 216 is connected to the aforementioned minus 6.3 volt supply. This prevents excessive wear and clattering of the relays 206—214. The winding of the relay 204 has one of its terminals connected through a rectifier to the conductor 162 and its other terminal connected through a bus 218 which is selectively connected to and disconnected from a bus 233 in this control 48 which is maintained at a potential 2 volts below ground.

One of the contacts 204a of the relay 204 is connected to one each of the sets of contacts 206a of the relay 206, 208a of the relay 208, 210a of the relay 210, 212a of the relay 212, and 214a of the relay 214. The other contacts of each of these sets of contacts 206a, 208a, 210a, 212a, and 214a are respectively connected to solenoids S1, S3, S5, S7 and S9 of the printer 42. The solenoids S1, S3, S5, S7 and S9 when energized act to actuate the 1, 3, 5, 7 and 9 keys of a print-out mechanism not illustrated but which is commercially available on the open market under the tradename Digit-Matic and sold by Victor Adding Machine Company. One of the contacts 204b of the relay 204 is connected to one of each of the sets of contacts 208b, 210b, 212b and 214b of the relays 208, 210, 212, 214 respectively. The other contacts of each of these sets of contacts are connected respectively to the solenoid windings S2, S4, S6 and S8 of the printer solenoids in the printer 42 which actuates the 2, 4, 6, and 8 keys. The opposite end terminals of the solenoids S1—S9 are all connected to a common bus 222 which is connected to one side of a power supply by means of a conductor 224 and a disconnect switch 226. The other side of the power supply is connected through the disconnect switch 226 and contacts 230a of a relay 230 to a bus 228. One terminal of the energizing winding 231 of a relay 232 is connected to this bus 228 and the other terminal of this winding 231 is connected to the bus 222. One contact of a set of normally opened contacts 232a of the relay 232 is connected to the bus 228 and the other thereof is connected through a solenoid SP to the bus 222. A capacitor C12 is connected in shunt with the winding 231 and acts as a delay device to delay closure of the contacts 232a for a predetermined time interval subsequent to energization of the buses 222 and 228. This interval permits the proper one of the solenoids S1—S9 to be energized and actuate proper printer key before the print solenoid SP causes the printer to print.

The relay amplifier control 48 comprises a pair of power valves or transistors T71 and T73 which control respectively the energization of the power supplying conductors 216 and 218 and which are themselves controlled by amplifying transistors T70 and T72 respectively. The amplifying transistor T72 is controlled from the programmer 44 via the conductor 250. Its emitter e is connected to the minus 2 volt power supplying bus 233 through a resistor network R71 having an intermediate terminal 244. Its collector $c$ is connected to the minus 6.3 volt bus 240. Its base $b$ is connected through a resistor R72 to the plus 30 volt bus 242 and through a resistor R73 to the conductor 250. The potential of the bus 250 may be placed either at ground potential in which event transistor T72 is maintained non-conducting or it may be placed at a potential substantially below ground in which the relative magnitudes of the resistors R72 and R73 have been so selected that the transistor T72 will be fully conductive. The base $b$ of transistor T73 is connected to the terminal 244 while the emitter $e$ of the transistor T73 is connected to the bus 233 and the collector $c$ is connected to conductor 218 through conductor 246. With this arrangement transistor T73 is rendered conductive and non-conductive by and in synchronism with the transistor T72 to connect and disconnect the conductor 218 to and from the power bus 233.

The power transistor T71 is controlled by the amplifying transistor T70 which in turn is controlled by the operation of the power transistor T73. The base $b$ of transistor T70 is connected to the common connection 249 of a pair of series connected resistors R74 and R75 connected between the bus 242 and the conductor 218. The emitter $e$ is connected to ground potential bus 234 and the collector $c$ is connected through a resistor R70 to the minus 30 volt bus 236. The base $b$ of the power transistor T71 is connected through a current limiting resistor to the collector $c$ of transistor T70. The collector $c$ of transistor T71 is directly connected to the bus 240. The emitter for control purposes is connected through a rectifier 238 to bus 234 and for power controlling purposes is connected to the power conductor 216. With this arrangement the programmer 44 is effective upon lowering of the potential of conductor 250 to render both of the power transistors T71 and T73 conductive for connecting power conductors 216 and 218 to the supply buses 240 and 233 respectively to render the relays 204—214 energizable in accordance with the operation of the decoder 36.

The energization of the key actuating solenoids S1—S9 and the printer solenoid SP is controlled by the print control 46 which is actuated in response to the connection of conductor 218 to the minus 2 volt supply bus 233. The print control 46 comprises an amplifying transistor T80 and a power valve or transistor T81. The power valve or transistor T81 has its emitter $e$ connected to a minus 2.0 volt bus 252 and its collector $c$ connected through the energizing winding of a relay 230 to the minus 6.3 volt bus 254 whereby conduction thereof energizes relay 230 to close its contacts 230a for energizing the conductors 222 and 228 of the printer 42. The conduction of transistor T81 is controlled by the transistor T80 and for this purpose has its base $b$ connected to the collector $c$ of the amplifier transistor T80.

The transistor T80 has its collector $c$ connected through a resistor R80A to a bus 256 held at 30 volts below ground and its emitter $e$ connected to the bus 252. With this arrangement the blocking of the normally conducting transistor T80 causes the power transistor T81 to conduct and vice versa to control the transistor T80, its base $b$ is connected through a capacitor C14 to the common terminal 258 between a pair of resistors R80 and R81 connected in series between the buses 252 and 256. The base $b$ of transistor T80 is also connected through a resistor R82 to the bus 256. With this circuitry and with no signal supplied to the terminal from the conductor 218 which is connected thereto through a rectifier 260, the transistor T80 will normally be maintained conducting to keep transistor T81 blocked and the buses 222 and 228 deenergized.

When the transistor T73 conducts, the potential of the conductor 218 will be maintained at minus 2 volts and current will flow through the rectifier 260 to raise the potential of the terminal 258 to that of the emitter $e$ of the transistor T80. The values of the resistors R80, R81, and R82 are so chosen that when this occurs the charging current which flows through the resistor R82 to charge the capacitor C14 to its new potential level will raise the potential of the base $b$ of transistor T80 sufficiently to cause the transistor T80 to block. When the transistor T80 blocks the base $b$ of transistor T81 is substantially lowered in potential and the power transistor T81 conducts. Conduction of the transistor T81 energizes the relay 230 whereby the relay contacts 230a close and conductors 222 and 228 are energized. Upon initial energization of the conductors the proper one of the solenoids S1—S9 (unless the digit count is zero) is energized and the capacitor C12 commences to charge. Energization of the proper one of the solenoids S1—S9 actuates the proper digit key. When the capacitor C12 reaches a critical charge the relay 232 closes its contacts 232a to energize the printer solenoid SP and the printer prints the digit. Only the solenoids S1—S9 are illustrated for the units digits. Where tens, hundreds, thousands, etc. are desired there would be provided corresponding solenoids S1—S9 for each and of course corresponding keys.

The blocked period of the transistor T80 and consequent conducting period of transistor T81 will depend upon the time constant of the capacitor C14 and the resistor R82 whereby the conducting period will be finite and independent of the conducting period of the transistor T73 as controlled by the programmer 44. This period needs to be only long enough for the printer 42 to operate as described.

The programmer 44 mentioned heretofore comprises a pair of valves or transistors T31 and T32 connected into a bistable multivibrator network. The transistor T31 has its emitter $e$ connected to the ground bus 126 and its collector $c$ connected through a resistor R90 to a minus 30 volt bus 260. The transistor T32 is similarly connected between the buses 126 and 260 through a resistor R91. The base $b$ of the transistor T31 is connected through a resistor R92 to the collector $c$ of the transistor T32 while the base $b$ of the transistor T32 is connected through a resistor R93 to the collector $c$ of the transistor T31. Resistor R94 connects the base $b$ of the transistor T31 to the plus 30 volt bus and a resistor R95 connects it to the minus 70 volt bus 82 through an OR network 56. The base $b$ of the transistor T32 is likewise connected through a resistor R96 to the bus 122 and through a resistor R97 and the contacts 17a of the pusher switch 17 to the minus 70 volt bus 82.

The control conductors 85 and 250 are connected to terminals 87 and 262. The terminal 87 is the common point between a pair of series connected resistors R98 and R99 which are connected between the buses 126 and 260. Similarly, the terminal 262 is the common point between a pair of series connected resistors R100 and R101 connected between the buses 126 and 260. A rectifier 264 connects the collector $c$ of transistor T32 to the terminal 87 and a rectifier 266 connects the collector $c$ of transistor T31 to the terminal 262. These rectifiers are so poled that when the transistors with which they are associated conduct the terminals to which they are connected are raised from a potential substantially below ground potential to substantially ground potential.

The OR network 45 through which the resistor R95 is connected to the bus 82 includes the contacts 120a of the manual reset switch 120 and the contacts 11a of the rider roll switch 11. The contacts 120a and 11a are in parallel with each other and the closure of either connects the base $b$ of the transistor T31 to the minus 70 volt bus 82 through resistor R95 whereby the multivibrator network may be placed in starting position with the transistor T31 conducting and the transistor T32 blocked. A capacitor C15 is connected between the conductors 121 and 250 the purpose of which will be brought out in connection with the over-all operation of the counting apparatus.

The numeral 468 represents the power supply for the various buses in the various circuit portions. The voltage output terminals may be energized in any suitable manner by rectifying networks or batteries. Preferably all of the voltage circuits should have a common zero volt or ground connection.

It is believed that the remainder of the details of construction may best be understood by description of operation of the apparatus which is as follows: The apparatus is initially placed in standby condition by closing the disconnect switch 226 which energizes the power unit 468 which has the various voltage output terminals to which the various voltage buses in the various of the networks are connected. Subsequent to the closure of the disconnect switch 226 the manual reset switch 120 is closed. Closure of the contacts 120a of this switch insures that transistor T31 is conducting and transistor T32 is blocked whereby the programmer 44 properly sets the gate 32, the counter 34, and the relay amplifier control 48. This cooperation may be seen in FIG. 2 by the arrowed lines leading from the programmer 44 to the gate 32, digit counter 34, and relay amplifier control 48.

More specifically, the closure of the contacts 120a lowers the potential of the base of the transistor T31 sufficiently to cause emitter to base current to flow therethrough and conduction of the transistor T31. When the transistor T31 conducts it raises the potential of the base of the transistor T32, which is connected to the collector c of transistor T31, sufficiently so that emitter to base current terminates in the transistor T32 and this transistor ceases to conduct. When transistor T32 blocks, the terminal 87 assumes a potential intermediate that of the buses 126 and 260 as determined by the relative values of the resistors R98 and R99. The values of these resistors are so chosen that the potential of the point 87 is sufficiently negative so that the transistor T12 will be in a conducting condition whenever the normally conducting transistor T11 blocks as described above in connection with the detailed description of the gate 32. Conduction of the transistor T31 raises the potential of terminal 262 and of conductor 250 to terminate conduction of the transistor T72 and thereby that of transistors T71 and T73 as explained above.

Closure of the contact 120b of the manual reset switch 120 raises the potential of the conductor 121. This is applied to the base b of the transistor T41 of the multivibrator network 88 whereby transistor T41 is rendered non-conducting and transistor T42 is rendered conducting. The increased voltage of the conductor 121 also raises the potential of the base b of the transistor T43 which blocks. With transistor T43 blocked, the transistors T44, T45, T46 and T47 conduct in the manner described above.

Conduction of the transistor T42 raised the potential of terminal 109 whereby the amplifying transistor T52 became blocked to permit the power transistor T53 to conduct and energize the bus 162 of the projection read-out device 38. Just as conduction of the transistor T42 raised the potential of terminal 109 so also did the blocking of transistor T41 lower the potential of terminal 107 to thereby lower the potential of conductor 166 permitting the conduction of amplifier transistor T50 and blocking of power transistor T51. Blocking of the power transistor T51 deenergized the bus 160 of the projection read-out device 38.

Blocking of the transistor T43 lowered the potential of the conductor 126 causing the amplifying transistor T60 and the power transistor T61 to conduct. Conduction of transistors T61 and T53 completed a circuit from the bus 172 through the transistor T61, conductor 174, lamp L0, buses 162, 158, and the transistor T53 to the minus 6.3 volt bus 154 whereby the lamp L0 is energized. The circuit from the conductor 174 to the relay 206 is only partially completed; this relay being prevented from being energized due to the now blocked condition of the power transistor T71. Likewise the relay 204 is prevented from being energized upon energization of the conductor 162 because of the blocked condition of the power transistor T73.

When paper from the machine roll 1 has been threaded over the idler roll 6, the broken paper switch 8 around the mandrel 5 and the started roll 4 has been placed upon the idler rolls 10 and 12, the rider roll 14 is placed on roll 4 and the rerolling operation is ready to commence as soon as the roll 14 is driven. The mechanism for this is not shown since within the concepts of this invention any suitable means may be used. Movement of the rider roll 14 into position also actuates the rider roll switch 11 to momentarily close its contacts 11a. This is without effect if the manual reset switch 120 has previously been closed as described. It does serve, however, to reset the programmer 44 whenever the manual resetting switch 120 is not used. In this event, the rendering of the transistor T31 conducting raises the potential of terminal 262 with the consequent blocking of transistor T72 and the resulting blocking of transistors T73, T70 and T71. The rise in potential of terminal 262 also acts through capacitor C15 to momentarily raise the potential of the conductor 121 to reset the counter 34. With the shipping roll 4 being driven, the paper 2 rides over roller 6, the switch 8 and its wound over the mandrel 5. Movement of its paper 2 rotates the roller 6 and the gear 24 which is driven by the roller 6. Each time one of the teeth 58 passes the feeler 28 of the unit 26, a voltage is generated by the unit 26. This voltage, as explained above, causes the transistor T1 to conduct and a momentary conduction of the transistor T4. Conduction of transistor T4 raises the potential of the conductor 72 to supply a blocking pulse to the transistor T11 of the gate 32. When this occurs the transistor T12 conducts to momentarily raise the potential of the conductor 86 if the gate 32 is open as described (transistor T32 non-conducting and switch contacts 8a open).

Raising of the potential of the conductor 86 flips the multivibrator 88 to reverse the conducting condition of the transistors T41 and T42. In the case of the first pulse after resetting this causes the transistor T41 to conduct and transistor T42 to become blocked. Conduction of the transistor T41 raises the potential of the terminal 107 whereby the transistor T50 is blocked to render the power transistor T51 conducting, for energization of the bus 160. Lamp L1 will now conduct. Lamp L0 will no longer conduct since the potential of conductor bus 140 became negative with respect to ground when transistor T42 blocked. This caused transistor T52 to conduct and transistor T53 to block. The blocking of the transistor T42 and the consequent lowering of the potential of the point 109 is without effect on any of the transistors T43, T44, T45, T46, T47 and transistor T43 continues to be the blocked one of this group of five transistors. Since the conductive conditions of the transistors T43—T47 did not change, the transistor T60 remains conducting and the transistors T62—T68 remain blocked.

The second of the teeth 58 to pass the feeler 28 likewise causes the transistor T1 to conduct and a momentary conduction of the transistor T4 whereby the pulse is again passed through the gate 32 to flip the network 88. This causes the transistor T42 to reconduct and the transistor T41 to block. Reconduction of the transistor T42 raised the potential of the terminal 109 and the conductor 140 connected thereto and blocking of the transistor T41 lowered the potential of the terminal 107. Transistor T51 blocks to deenergize bus 160 and transistor T53 conducts to reenergize bus 162. This does not result in the reenergization of the lamp L0 since the raising of the potential of the conductor 140 caused transistor T44 to block and this resulted in transistor T43 becoming conducting. With transistor T43 conducting and T44 blocked the bus 126 is now at substantially ground potential and the bus 127 is now substantially below ground potential. Transistors T62 and T63 conduct to energize conductor 176. Lamp L2 is now energized through an obvious circuit signifying that 2 feet of paper have passed from the machine roll 1 to the shipping roll 4. Similarly the passage of additional teeth by the feeler 28 will result in actuation of the bistable multivibrator network 88 whereby the transistors T41 and T42 are alternately rendered conductive and nonconductive to progressively pass the "blocked-transistor" condition of the around the "ring-of-five" transistors T43—T47. It may now be seen that each time tooth 58 passes the feeler 28 the counter 34 is energized and causes the projection read-out to visually indicate the number of foot units which have passed from the machine roll 1 to the shipping roll 4.

It will now be apparent that the multivibrator network 88 of the counter or pulse responsive device 34 controls the energization of busses 174, 176, 178, 180, 182, 160 and 162. The pulse responsive device 34 is operable to raise the potential of a first buss 162 of the buses 174, 176, 178, 180, 182, 160 and 162 from a highly negative potential to ground potential as a consequence of the reception of the alternate first pulses (those pulses which render transistor T42 conducting) of the pulses supplied by the pickup unit 22 and to raise the potential of a second bus 160 of these buses 174, 176, 178, 180, 182, 160 and 162 from a highly negative potential to ground potential as a consequence of the reception of alternate second pulses (those pulses which render transistor T41 conducting) of the pulses supplied by the pickup unit 22 to the pulse responsive device 34. The pulse responsive device 34 is further operable, through its "ring-of-five" transistors T34—T47 to control the potential of the other buses 174, 176, 178, 180 and 182 of the buses 174, 176, 178, 180, 182, 160 and 162 whereby these other buses 174, 176, 178, 180 and 182 are energized in succession in response to the reception of the alternating first pulses (those alternate pulses which render transistor T42 conducting) to energize the other buses 174, 176, 178, 180 and 182 in succession. The buses 174, 176, 178, 180 and 182 are also connected through relays 206, 208, 210, 212 and 214 to the windings S1—S9 of the solenoids of the magnetic operator. The windings S1—S9 can only be actuated upon closure of the contacts 230a of the relay 230 associated with the print control or actuator 46.

As has been indicated above, each time that the transistor T47 is rendered blocked and then rerendered conducting a pulse may be taken from the terminal 90 and supplied to a "ten counter" like counter 34 which will then be actuated every tenth foot for indicating each ten digits of the unit counter. This ten counter when provided with its own transistor amplifier and decoder like 36 and its own projection read-out like 38 will indicate the tens digits of paper footage. Similarly, additional counters, decoders and read-outs may be provided for hundreds, thousands, etc.

In the event that the paper 2 should break, the broken paper switch 8 will close its contacts 8a. Closure of these contacts 8a connects the base b of the transistor T11 to the minus 70 volt bus 82 and the transistor T11 remains conducting thereby rendering the gate 32 effective to prevent the passage of pulses from the amplifier and shaper 30 to the counter 34. With this arrangement any rotation of the roller 6 and the gear 24 is without effect to actuate the counter 34 and the subsequent apparatus. After the paper break has been repaired, the broken paper switch 8 will again maintain its contacts 8a open and the counter will continue to count the additional footage which is added to the roll 4.

When the required amount of paper has been placed upon the shipping roll 4, the drive roll 14 is rendered ineffective to rotate roll 4. The paper 2 is now cut by suitable mechanism, not shown, and the roll sealed after which the pusher roll 16 is energized to move the completed shipping roll 4 from the idler rolls 10 and 12 onto the incline 18 where it is moved for storage or shipment. Movement of the push roll 16 actuates the pusher switch 17 which momentarily closes the contacts 17a thereof to flip the multivibrator of the programmer 44. The transistor T32 now conducts and the transistor T31 blocks. Conduction of transistor T32 raises the potential of conductor 85 to open the gate 32. The blocking of transistor T31 lowers the potential of the terminal 262 and of the conductors 121 and 250. The lowering of the potential of the conductor 121 which leads to the counter 34 is without effect due to the presence of the rectifiers 124 and 132. The lowering of the potential of the conductor 250 causes the amplifying transistor T72 to conduct. This results, as described in detail above, in the actuation of the printer 42 which prints a record of the footage of paper on the just completed shipping roll.

When a second shipping roll 4 is to be made, the paper 2 is again threaded around a mandrel 5 and placed upon the idler rolls 10 and 12. The rider 14 is then placed into position. The rider roll switch 11a momentarily closes to flip the multivibrator in the programmer 44 to render the transistor T31 conducting and transistor T32 blocked. This resets the apparatus as described above and when the rider roll 14 is again driven the counter will again function as just described. Subsequent measure operations will be accomplished as set forth above.

While only a single embodiment of the invention has been shown, it will be appreciated that many modifications may be made thereto and still come within the scope of the appended claims.

What is claimed and is desired to be secured by United States Letters Patent is as follows:

1. In a system for counting a quantity of a substance, a pulse generator for producing a pulse for each unit of said quantity, a pulse responsive counter for counting the number of pulses supplied thereto, a gating device connected between said generator and said counter and operable to transmit pulses from said generator to said counter, a control device operably connected to said gating device and operable in a first condition to render said gating device effective to transmit said pulses, and means actuated by said substance to actuate said gating device.

2. In a system for counting a quantity of a substance, a pulse generator for producing a pulse for each unit of said quantity, a pulse responsive counter for counting the number of pulses supplied thereto, a gating device connected between said generator and said counter and operable to transmit pulses from said generator to said counter, a control device operably connected to said gating device and operable in a first condition to render said gating device effective to transmit said pulses, means actuated by said substance to actuate said gating device, a visual indicating read-out device actuated by said counter and operable to indicate the total number of said pulses counted by said counter, and means operably connecting said control device to said counter, said control device being operable to reset said read-out device.

3. In a system for counting a quantity of a substance, a pulse generator for producing a pulse for each unit of said quantity, a pulse responsive counter for counting the number of pulses supplied thereto, a gating device connected between said generator and said counter and operable to transmit pulses from said generator to said counter, a control device operably connected to said gating device and operable in a first condition to render said gating device effective to transmit said pulses, means actuated by said substance to actuate said gating device, a visual indicating read-out device actuated by said counter and operable to indicate the total number of said pulses counted by said counter, and means operably connecting said control device to said counter, said control device having a second condition operable to render said gating device ineffective to transmit said pulses, said control device further being effective upon actuation from said second condition to said first condition to reset said read-out device.

4. In a system for counting a quantity of a substance, a pulse generator for producing a pulse for each unit of said quantity, a digital counter responsive to the number of pulses supplied thereto, a printing device including a plurality of relays, means connecting said counter to said relays whereby said relays may be actuated in accordance with the number of pulses supplied to said counter, a control device, means connecting said control device to said printing device, said control device having a first condition and operable in said first condition to render said relays ineffective to respond to said counter, said control device having a second condition and being effective in said second condition to render said relays responsive to said counter and to actuate said printing device, and time delay means operable to delay the actuation of said printing device for a predetermined time interval subsequent to actuation of said printing device by said control device.

5. In a counting mechanism for determining the amount of a substance which has passed a point, a voltage pulse producing device for producing a pulse for each unit of said substance which passes said point, a master controlling network, a pulse responsive counting device, means including a gate interconnecting said pulse producing device and said counting device, a printing apparatus, means including a control device interconnecting said counting device and said printing apparatus, and means connecting said master network to said gate and said control device, said master network being operable in a first condition to render said gate effective to permit said pulses to be supplied to said counting device and to prevent actuation of said printing apparatus, said master network being operable in a second condition to render said gate effective to prevent said pulses to be supplied to said counting device and to permit actuation of said printing apparatus.

6. In a counting mechanism for determining the amount of a substance which has passed a point, a voltage pulse producing device for producing a pulse for each unit of said substance which passes said point, a master controlling network, a pulse responsive counting device, means including a gate interconnecting said pulse producing device and said counting device, a printing apparatus, means including a control device interconnecting said counting device and said printing apparatus, means connecting said master network to said gate and said control device, said master network being operable in a first condition to render said gate effective to permit said pulses to be supplied to said counting device and to prevent actuation of said printing apparatus, said master network being operable in a second condition to render said gate effective to prevent said pulses to be supplied to said counting device and to permit actuation of said printing apparatus, and means actuated as a consequence of said master network being rendered into said first condition from said second condition to reset said counting device to an initial condition.

7. In a counting mechanism for determining the amount of a substance which has passed a point, a voltage pulse producing device for producing a pulse for each unit of said substance which passes said point, a master controlling network, a pulse responsive counting device, means including a gate interconnecting said pulse producing device and said counting device, a printing apparatus, means including a control device interconnecting said counting device and said printing apparatus, and means connecting said master network to said gate and said control device, said master network being operable in a first condition to render said gate effective to permit said pulses to be supplied to said counting device and to prevent actuation of said printing apparatus, said master network being operable in a second condition to render said gate effective to prevent said pulses to be supplied to said counting device and to permit actuation of said printing apparatus, said control device including a timing device for determining the interval during which said printing apparatus is actuated.

8. In a counting mechanism for measuring the quantity of a substance which passes a point, a pulse generator, means actuated by said substance for causing said generator to supply pulses, a pulse responsive device operatively connected for operation by said pulses, a plurality of buses, said device being operable to render a first bus of said buses energized on alternate first pulses of said pulses and to render a second bus of said buses energized on alternate second pulses of said pulses, said device being operable to render other buses of said buses energized in succession in response to said first pulses, and a plurality of pairs of indicating devices, said pairs of devices being individually connected to each of said other buses, means connecting one of said devices of each of said pairs to said first bus and the other of said devices of each of said pairs to said second bus.

9. In a counting mechanism for measuring the quantity of substance which passes a point, a pulse generator, means actuated by said substance for causing said generator to supply pulses, a pulse responsive device, gate means connecting said generator and said pulse responsive device for operation of said device by said pulses, a plurality of buses, said device being operable to render a first bus of said buses energized on alternate first pulses of said pulses and to render a second bus of said buses energized on alternate second pulses of said pulses, said device being operable to render other buses of said buses energized in succession in response to said first pulses, a plurality of pairs of indicating devices, said pairs of devices being individually connected to each of said other buses, means connecting one of said devices of each of said pairs of said first bus and the other of said devices of each of said pairs to said second bus, and a control device operatively connected to said gate means and to said pulse responsive device, said control device having a first operating condition for opening said gate means whereby pulses are delivered from said generator to said pulse responsive device and having a second operating condition for closing said gate means to prevent the delivery of pulses to said pulse responsive device and for resetting said pulse responsive device to an initial condition.

10. In a counting mechanism for measuring the quantity of a substance which passes a point, a pulse generator, means actuated by said substance for causing said generator to supply pulses, a pulse responsive device, gate means connecting said generator and said pulse responsive device for operation of said device by said pulses, a plurality of buses, said device being operable to render a first bus of said buses energized on alternate first pulses of said pulses and to render a second bus of said buses energized on alternate second pulses of said pulses, said device being operable to render other buses of said buses energized in succession in response to said first pulses, a plurality of pairs of indicating devices, said pairs of devices being individually connected to each of said other buses, means connecting one of said devices of each of said pairs to said first bus and the other of said devices of each of said pairs to said second bus, a control device operatively connected to said gate means and to said pulse responsive device, said control device having a first operating condition for opening said gate means whereby pulses are delivered from said generator to said pulse responsive device and having a second operating condition for closing said gate means to prevent the delivery of pulses to said pulse responsive device and for resetting said pulse responsive device to an initial condition, a plurality of first magnetic operators, means including an actuator for rendering said operators responsive to the energization of said other buses, and means responsive to the rendering of said control device into its said second condition for rendering said actuator effective to cause energization of one of said operators.

11. In a counting mechanism for measuring the quantity of a substance which passes a point, a pulse generator, means actuated by said substance for causing said generator to supply pulses, a pulse responsive device, gate means connecting said generator and said pulse responsive device for operation of said device by said pulses, a plurality of buses, said device being operable to render a first bus of said buses energized on alternate first pulses of said pulses and to render a second bus of said buses energized on alternate second pulses of said pulses, said device being operable to render other buses of said buses energized in succession in response to said first pulses, a plurality of pairs of indicating devices, said pairs of devices being individually connected to each of said other buses, means connecting one of said devices of each of said pairs to said first bus and the other of said devices of each of said pairs to said second bus, a control device operatively connected to said gate means and to said pulse responsive device, said control device having a first operating condition for opening said gate means whereby pulses are delivered from said generator to said pulse responsive device and having a second operating condition for closing said gate means to prevent the delivery of pulses to said pulse responsive device and for resetting said pulse responsive device to an initial condition, a plurality of first magnetic operators, means including an actuator for rendering said operators responsive to the energization of said other buses, and means responsive to the rendering of said control device into its said second condition for rendering said actuator effective to cause energization of one operator of said operators, said actuator including a timing device for limiting the energization time of said one operator.

12. In a counting mechanism for measuring the quantity of a substance which passes a point, a pulse generator, measn actuated by said substance for causing said generator to supply pulses, a pulse responsive device operatively connected for operation by said pulses, a plurality of buses, said device being operable to render a first bus of said buses energized on alternate first pulses of said pulses and to render a second bus of said buses energized on alternate second pulses of said pulses, said device being operable to render other buses of said buses energized in succession in response to said first pulses, a plurality of pairs of indicating devices, said pairs of devices being individually connected to each of said other buses, means connecting one of said devices of each of said pairs to said first bus and the other of said devices of each of said pairs to said second bus, a plurality of relay devices, one relay device of said relay devices being operatively connected to one bus of said first and said second buses for energization in accordance with the energized condition of said just-named one bus, means connecting other relay devices of said relay devices to said other buses, at least some of said other relay devices having two sets of contacts, said one relay device having a normally open set of contacts and a normally closed set of contacts, a plurality of magnetic operators, means individually connecting a first group of said operators through one of said two sets of contacts and said normally open set of contacts to a pair of terminals, means individually connecting a second group of said operators through the other of said two sets of contacts and said normally closed set of contacts to said pair of terminals, and a control device for energizing said terminals for a predetermined time interval.

13. In a system for counting a quantity of a substance, a pulse generator for producing a pulse for each unit of said quantity, a pulse responsive counter for counting the number of pulses supplied thereto, a gating device connected between said generator and said counter and operable to transmit pulses from said generator to said counter, a control device operably connected to said gating device and operable in a first condition to render said gating device effective to transmit said pulses, a visual indicating read-out device actuated by said counter and operable to indicate the total number of said pulses counted by said counter, and means operably connecting said control device to said counter, said control device being operable to reset said read-out device.

14. In a system for counting a quantity of a substance, a pulse generator for producing a pulse for each unit of said quantity, an indicating device having indicating means responsive to the number of pulses supplied thereto and having an output network energized in accordance with the number of said pulses supplied thereto, a printing device including a quantity responsive mechanism and an actuator for printing such quantity, means connecting said output network to said indicating device, a control device connected to said printing device and having a first operating condition rendering said quantity responsive mechanism ineffective to respond to said output network, said control device having a second operating condition rendering effective in timed sequence said quantity responsive mechanism and said actuator.

15. In a system for counting a number of units of a substance, a pulse generator for producing a pulse for each of said units, an indicating device having an output network energized in accordance with the number of pulses supplied thereto, means including a gate connecting said generator to said device, said gate having an open condition in which pulses generated by said generator are passed to said device and a closed condition in which pulses generated by said generator are prevented from passing to said device, a programmer connected to control the operation of said gate and connected to control said device, said programmer being effective in a first operating condition to open said gate and in a second operating condition to close said gate, said programmer further being effective as a consequence of being placed in its said first operating condition to actuate said device to a predetermined energized condition.

16. In a system for counting a number of units of a substance, a pulse generator for producing a pulse for each of said units, an indicating device having an output network energized in accordance with the number of pulses supplied thereto, said device having an initial condition and an energized condition dependent upon the number of pulses supplied thereto, means including a gate connecting said generator to said device, said gate having an open condition in which pulses generated by said generator are passed to said device and a closed condition in which pulses generated by said generator are prevented from passing to said device, a programmer connected to control the operation of said gate and connected to control said device, said programmer being effective in a first operating condition to open said gate and to place said device in its said initial conditon, said programmer being effective in a second operating condition to close said gate, and means actuated by said programmer for rendering said programmer ineffective to actuate said device except during a predetermined time interval.

17. In a measuring system, a pulse generator producing pulses proportional in number to the units measured, an indicating device for indicating the totalized sum of pulses supplied thereto, said device having an initial condition and an energized condition dependent upon the number of pulses supplied thereto, a printer including printing mechanism actuated in accordance with said energized condition of said device and mechanism actuating means for causing said printer to print a printed indication of the actuated condition of said printing mechanism, a gate connecting said generator to said indicating device, said gate having an open condition in which pulses generated by said generator are passed to said device and a closed condition in which pulses generated by said generator are prevented from passing to said device, print control means interconnecting said device and said printer and effective in a first condition to render said mechanism and said mechanism actuating means ineffective, said print control means being effective in a second condition to render said mechanism and said mechanism actuating means effective, a programmer having first and second operating conditions, means connecting said programmer to said gate and to said print control means, said programmer being operable in its said first condition to open said gate and to place said print control means in its said first condition, said programmer being operable in its said second condition to close said gate and to place said print control means in its said second condition, and means interconnecting said programmer and said gate and actuated as a consequence of the actuation of said programmer from its said second to its said first condition to momentarily actuate said device to its said initial condition.

18. In combination, a pulse generator, a pulse actuated counter for totalizing the number of pulses supplied to said counter, a gate having a pair of valves, a first of said valves being normally conducting and connected to said generator for actuation to a nonconductive condition as a consequence of the generation of a pulse of said generator, the other of said valves being operatively connected to said first valve and normally held nonconductive as a consequence of the conduction thereof, means connecting said other valve to said counter for actuation of said counter as a consequence of a change in the conductive condition thereof, and control means for controlling the conductivity of at least one said valve independently of said generator to render said other valve ineffective to actuate said counter.

19. In combination, a pulse generator, a pulse actuated counter for totalizing the number of pulses supplied to said counter, a gate having a pair of valves, a first of said valves being normally conducting and connected to said generator for actuation to a nonconductive condition as a consequence of the generation of a pulse of said generator, the other of said valves being operatively connected to said first valve and normally held nonconductive as a consequence of the conduction thereof, means connecting said other valve to said counter for actuation of said counter as a consequence of a change in the conductive condition thereof, and control means independent of said generator controlling the conductivity of each of said valves to render said other valve ineffective to actuate said counter.

References Cited in the file of this patent
UNITED STATES PATENTS

| | | |
|---|---|---|
| 2,761,986 | Wald et al. | Sept. 4, 1956 |
| 2,783,540 | Berry | Mar. 5, 1957 |